Oct. 8, 1957  P. G. DE SEE  2,808,970

DISPENSING CAPS FOR CONTAINERS

Filed Nov. 23, 1956

INVENTOR.
PETER G. DE SEE,
BY Max Wall

ATTORNEY.

2,808,970

DISPENSING CAPS FOR CONTAINERS

Peter G. De See, Hawthorne, N. J.

Application November 23, 1956, Serial No. 623,870

5 Claims. (Cl. 222—459)

This invention relates to a cover for containers adapted to dispense fluent materials such as sugar and like hygroscopic products which has the tendency to absorb moisture from the air and form into lumps. More particularly, it relates to the type of dispensing cap or cover having means to break up such lumps as form in the container, so that the product may readily be poured under any atmospheric conditions.

It is well kwnown that with the conventional salt or sugar dispenser or shaker having a cap with a plurality of small holes in its surface, it is difficult and well nigh impossible to dispense the product when the atmosphere is humid and damp. The product has a tendency to lump and cake and will not flow or discharge from the shaker. Various expedients have been devised in the art to overcome this characteristic, but the problem remains essentialy unsolved. One expedient, in the case of sugar dispensers, has been to provide a cap with a large single opening, the cap being funnel shaped so as to direct the sugar to said opening. This works with fair success until a lump or cake blocks the opening, at which time the flow is cut off.

The present invention is specifically concerned with this latter type of cap having a single large opening, but means are provided for preventing the blocking of said opening so that the fluent material may continue to be discharged even though lumps or cakes are present in the mass. To indicate the relative size of the opening, it may be said that the opening is of a substantially greater diameter than the thickness of each of the tines.

The invention contemplates the provision of a series of tines to be disposed about the opening, the tines being integral with the cap, extending inwardly thereof about said opening, and being disposed at equidistant points about said opening, the distance between the tines being less than the diameter of the opening so as to prevent a lump from blocking the opening.

Among the objects of the invention are the provision of a simple, cheap, easily made dispensing type cap for sugar containers and the like, which will tend to break up in use any lump or cake which may form.

The full nature, and other objects and advantages of the invention will be more fully understood by reference to the accompanying drawings and specification, showing and describing the invention.

In the drawings

Figure 1:
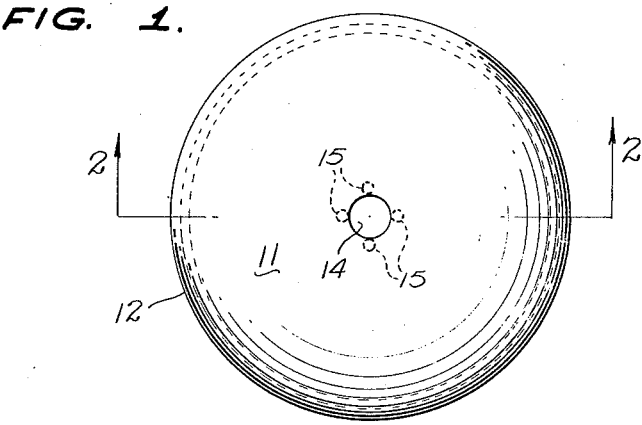
Figure 1 is a top plan view of a cap embodying the invention.
Figure 2:
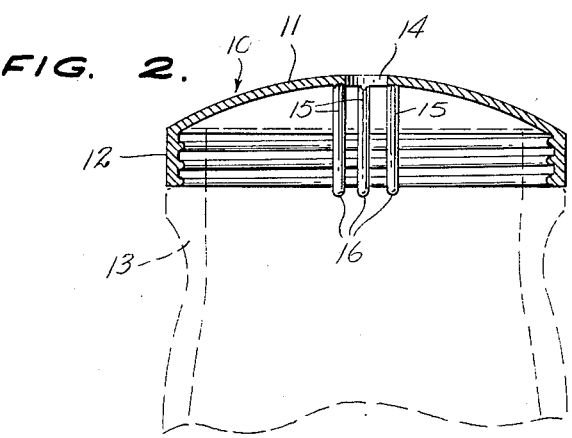
Figure 2 is a vertical, sectional view of the cap taken along the line 2—2 of Figure 1.
Figure 3:
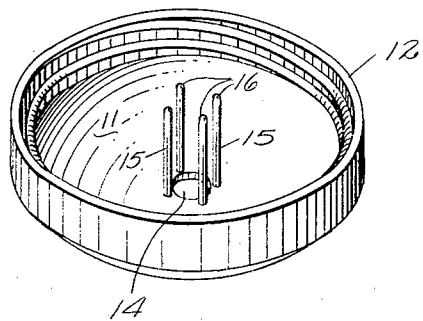
Figure 3 is a perspective view, looking at the cap from its underside.

The invention comprises a cap or closure member 10 for a container, the cap having a convex cover portion 11 and a flanged rim 12 which may be made for a screw threaded or plain friction fit with the container 13, as desired. The cover portion is provided with a large central discharge opening 14, and extending inwardly of the cap and surrounding this opening are a plurality of tine members 15. These tines may be of any desired length, but are preferably of a length substantially equal to the greatest depth of the cap about the discharge opening. The longer the tines, the greater their lump blocking or straining function. They may be spaced equidistantly about the edge of the opening, but the distance between tines circumferentially about the opening is preferably less than the diameter of the opening so as to prevent a lump or cake from blocking the opening. Thus, if the container shown in Figure 2 were partially filled with sugar, for example, containing a number of lumps, and it were inverted to discharge the sugar, the tines would prevent any lump larger than the space between the tines from reaching the discharge opening, and sugar could continue to flow around the tines not so blocked. Any lump smaller than the distance between the tines would also be smaller than the opening and therefore would readily pass through and not block said opening.

The tines also perform another useful function. When the container is inverted to pour sugar, or is agitated for that purpose, any lump present in the container will be thrown forcibly against the tines and be broken up on their blunt points 16, which may be made sharp if desired.

The cap is preferably made of a plastic material such as polyethylene, which is relatively strong and unbreakable, but other suitable materials may be used, and if made of the plastic, it may be cheaply made by the well known injection molding method. It is suitable for table use and particularly so for outings, picnics and the like.

Changes in the construction and design of this invention may be made without departing from the spirit thereof as defined by the appended claims.

I claim:

1. A container cap for dispensing fluent materials comprising a cover portion having a discharge opening therein, and a series of tine members spaced about and encircling said opening in a regular order, and extending inwardly of said cap, said opening being of substantially greater diameter than the thickness of each of said tine members.

2. A container cap for dispensing fluent materials comprising a cover portion having a discharge opening therein and a series of tine members spaced about and encircling said opening at equidistant points about its perimeter, said tines extending inwardly of said cap, said opening being of substantially greater diameter than the thickness of each of said time members.

3. A container cap for dispensing fluent materials comprising a concave cover portion having a flanged rim for attachment to a container, a single, centrally disposed discharge opening in said cover portion, and a plurality of tines positioned about said opening at the edge thereof so as to encircle same, said tines having a length substantially equal to the extent of said concavity at its greatest depth, said opening being of substantially greater diameter than the thickness of each of said tine members.

4. A container cap for dispensing fluent materials comprising a cover portion having a discharge opening therein, and a series of tines disposed about the edge of said opening and encircling same, the distance between the tines being less than the diameter of said opening.

5. A molded plastic cap for containers for dispensing fluent materials comprising a concave cover portion having a flanged rim for attachment to a container, said cover portion having a single, centrally disposed discharge opening, a series of rigid tine members integral with said cap and extending inwardly thereof about said opening and encircling same, said tines being disposed at equidistant points about said opening, the distance between the tines circumferentially around the opening being less than the diameter of said opening, said tines having a length substantially equal to the depth of said cap about said opening, and being of a substantially uniform diameter throughout their length.

References Cited in the file of this patent

UNITED STATES PATENTS

| | | |
|---|---|---|
| 270,131 | Rogers | Jan. 2, 1883 |
| 2,756,909 | Hedu | July 31, 1956 |